3,288,824
ESTERIFICATION OF TRIGLYCERIDE WITH POLY-
ETHYLENE GLYCOLS AND PRODUCT
Emile Mahler, 30 Rue Malesherbes, and Marcel Gatte-
fosse, 33 Cours Eugenie, both of Lyon, France
No Drawing. Filed May 15, 1963, Ser. No. 281,858
14 Claims. (Cl. 260—410.6)

This application is a continuation-in-part of application Serial No. 646,521, filed March 18, 1957, now abandoned.

This invention relates to novel compositions formed by the interaction of fats and oils, i.e., triglycerides, with polyethylene glycol. More particularly, it is directed to the products formed by the interaction of two mols of a triglyceride with one mol of a polyethylene glycol having a molecular weights of 200 to 800.

The product formed consists of a mixture of unreacted triglyceride, mono- and di-glycerides and mono- and di-esters of the polyethylene glycols.

The products are produced by reacting a polyethylene glycol with a triglyceride, in the proportion stated above, in the presence of an esterification catalyst such as lime, soda and phosphoric acid, in an amount of about 0.05 to 0.2% by weight of the triglyceride. The reaction involves transesterification, which is carried out under agitation at a temperature of about 205 to 225° C. under atmospheric pressure, and preferably in an inert atmosphere, as for example, nitrogen. The reaction lasts about two hours.

The obtained product possesses outstanding properties, as for example:

(1) Miscibility in all proportions with hydrocarbons, particularly kerosene, Vaseline, oil, paraffin oil; as well as with triglycerides, particularly the vegetable oils, yielding limpid solutions.

The formed products are novel in that they are capable of diffusing through tissues, thus providing for local application to the skin or to the mucous membranes. Thus they are useful in pomades, intramuscular and subcutaneous injectibles; oral or nasal absorption, as for example, in vitaminized oils or antiseptic nasal oils, rectal absorption as in suppositories, etc.

The products of this invention, either in the original state or in solutions, are useful for the production of fine emulsions of the "oil-in-water" type which are opaque and not translucent; and which possess short stability. This characteristic of the product is in marked contrast to that of the known surface active agents which, when soluble in kerosene, produce only very crude or translucent oil-in-water emulsions.

(2) The product is practically neutral. The acid number thereof does not exceed 2. A dispersion of 10% of the product in water provides a pH of from 6.7 to 7.3.

(3) The product possesses antioxidant activity. When added to mono- or poly-unsaturated triglycerides, the product prevents peroxide formation.

(4) The product is neither toxic nor irritating in character when applied to mucous membranes; nor is it hemolytic.

The product differs markedly from that produced by the interaction of 1 mol of triglyceride with two mols of the polyethylene glycol, as well as the product resulting from the interatcion of equimolecular amounts of the triglyceride with polyethylene glycol.

In the following tables are set forth comparisons of products made from a triglyceride and polyethylene glycol 300 in the varying molar proportions just mentioned:

Product A: From one mol of triglyceride and two mols of polyethylene glycol 300.

Product B: From one mol of triglyceride and one mol of polyethylene glycol 300.

Product C: From two mols of triglyceride and one mol of polyethylene glycol 300.

PHYSICAL AND CHEMICAL CONSTANTS

| | Kernel Oil Triglyceride | Product A | Product B | Product C |
|---|---|---|---|---|
| Aspect | Homogeneous | Homogeneous | Heterogeneous | Homogeneous. |
| Color | Brownish | Pale Yellow | Pale Yellow | Yellow. |
| Saponification Number | 190–194 | 114–121 | 144–151 | 158–165. |

SOLUBILITY

| | Ethanol 96% | Kerosene |
|---|---|---|
| Kernel Oil Triglyceride | Insoluble | Soluble. |
| Product A | Soluble | Inso'uble. |
| Product B | ----do---- | Soluble. |
| Product C | Insoluble | Do. |

BIOLOGICAL PROPERTIES

| | Hemolytic action |
|---|---|
| Kernel oil triglyceride | Null. |
| Product A | Not null. |
| Product B | Do. |
| Product C | Null. |

The "kernel oil triglyceride" referred to in this specification is an oil having an iodine number of 108.7; a saponification number of 190.2; and a fatty acid content of: saturated fatty acids—3.6%; oleic acid—60.6%; and linoleic acid—30%.

It will be observed that Product C products obtained in accordance with this invention, possess properties which are altogether different from the partial esters obtained by the alcoholysis of triglycerides with polyethylene glycol as exhibited by Products A and B; as well as that of the parent triglycerides.

Products produced when using the proportions of starting materials employed for preparing Product C, when the molecular weight of the polyethylene glycol is less than 200, (for example, when the polyethylene glycol has a molecular weight of 106) produce emulsions wherein the oil is in the continuous phase as contrasted with the emulsions obtained from the products in accordance with this invention.

On the other hand, the products obtained, when using the proportions of the starting materials employed in making Product C, but using a polyethylene glycol having a molecular weight greater than 800, are incompletely soluble in kerosene. The range of application of the instant product is wide, being limited, however, by the exclusion of polyethylene glycols of a molar weight of less than 200 or more than 800.

The following table sets forth such characteristics.

SOLUBILITIES

|  | Ethanol 96% | Kerosene | Water |
|---|---|---|---|
| Product C, Kernel Oil Diethylene glycol. | Insoluble | Soluble | C.P.O.[1] |
| Product C, Kernel Oil PEG[2] 200 | do | do | C.P.W.[3] |
| Product C, Kernel Oil PEG[2] 300 | do | do | C.P.W.[3] |
| Product C, Kernel Oil PEG[2] 400 | do | do | C.P.W.[3] |
| Product C, Kernel Oil PEG[2] 600 | do | Initially slightly turbid, then soluble. | C.P.W.[3] |
| Product C, Kernel Oil PEG[2] 800 | do | <7% cloudy / >7% soluble | C.P.W.[3] |
| Product C, Kernel Oil PEG[2] 1,000 | Partially soluble | <25% cloudy / >25% soluble | C.P.W.[3] |
| Product C, Kernel Oil PEG[2] 1,540 | Soluble | Insoluble | C.P.W.[3] |

[1] Continuous phase oil—water-in-oil.
[2] Polyethylene glycol.
[3] Continuous phase water—oil-in-water.

From the foregoing data, it will be observed that the

SOLUBILITIES OF VARIOUS OLEATES IN ETHANOL AND KEROSENE

|  | Ethanol 96% | Kerosene | Water |
|---|---|---|---|
| Mono-oleate of ethylene glycol | Soluble | Soluble | C.P.O. |
| Mono-oleate of diethylene glycol | do | do | C.P.O. |
| Mono-oleate of propylene glycol | do | do | C.P.O. |
| Mono-oleate of triethylene glycol | do | Partially soluble | C.P.O. |
| Mono-oleate of glycerol | do | Almost insoluble | C.P.O. |
| Mono-oleate of PEG 300 | do | Insoluble | C.P.W. |
| Mono-di-oleate of PEG 300 | do | Partially soluble | C.P.W. |
| Di-oleate of PEG 300 | do | Soluble | C.P.W. |
| Mono-oleate of PEG 400 | do | Partially soluble | C.P.W. |
| Di-oleate of PEG 400 | do | do | C.P.W. |
| Mono-oleate of PEG 500 | do | do | C.P.W. |
| Mono-oleate of PEG 600 | do | Very slightly soluble | C.P.W. |
| Di-oleate of PEG 600 | do | Partially soluble | C.P.W. |
| Mono-oleate of PEG 1,540 | do | Insoluble | Soluble |
| Di-oleate of PEG 1,540 | do | do | Do. |
| Mono-oleate of sorbitan-polyethylene oxide condensation (20 mols of $C_2H_4O$), Tween 80. | do | do | Do. |
| Mono-oleate of sorbitan | do | do | C.P.O. | products of this invention differ from that of the fatty acid esters of glycols and polyethylene glycols in being insoluble in ethanol as are the triglycerides, per se.

This is one of the major distinctions which points up sharply the principal characteristics of the products of this invention and show that like the triglycerides they are insoluble in ethanol and are neighbors of the esters in that they form emulsions whereof the water is in the continuous phase.

INTERFACIAL AND SURFACE TENSION CURVES

The characteristics of the instant product is brought sharply into focus by the interfacial and surface tension curves thereof. The nature of that curve is altogether different from that of products such as Product A and Product B, as well as that of commercial esters which have far greater tension activity than do the products of this invention.

The products of this invention constitute a class which is intermediate that of the original triglycerides and conventional esters prepared therefrom.

The products of this invention possess in part properties of the parent glycerides in that they are completely miscible with triglyceride (natural or synthetic) but that they possess novel properties in consequence of the partial glycolysis which constitutes the present invention, notably dispersibility in water which is not possessed by the triglycerides.

Furthermore, the products of this invention are not soluble in water to the extent possessed by the fatty acid esters of polyglycols. They are only dispersible.

The present invention constitutes in effect an unnatural repartition of the fatty acid of the glycerol into an "inter ester" consisting of a mixture of well defined partial esters.

These partial esters can be separated by chromatography. A chromatogram of the instant products shows a very different picture from a chromatogram of esters of polyethylene glycol.

It is to be noted that a paper chromatogram of the products of this invention does not show any trace of free polyethylene glycol, a characteristic which often appears in the chromatography of commercial esters of polyethylene glycol.

Numerous products in accordance with this invention obtained from a variety of natural glycerides have resulted in the formation of perfectly defined, reproducible products which are markedly distinct from the parent triglycerides as set forth in the following table:

| Nomenclature | Free Acid (as oleic) Percent | Saponification Number | Iodine Number |
|---|---|---|---|
| Sweet almond oil | <1 | 190–194 | 92–99 |
| Product C from sweet almond oil and PEG 300 |  | 155–170 |  |
| Apricot kernel oil | <2 | 190–194 | 92–108 |
| Product C from apricot kernel oil and PEG 300 | <1 | 158–165 | 75–85 |
| Olive oil | <2 | 188–195 | 79–84 |
| Product C from olive oil and PEG 300 | <1 | 150–170 | 65–70 |
| Peanut oil | <1 | 190–194 | 85–92 |
| Product C from peanut oil and PEG 300 | <1 | 155–170 | 65–80 |
| Corn oil | <1 | 187–193 | 103–128 |
| Product C from peanut oil and PEG 300 | <1 | 155–170 | 90–110 |
| Sunflower seed oil | <1 | 188–194 | 125–136 |
| Product C from sunflower seed oil and PEG 300 | <1 | 150–170 | 105–120 |
| Soybean oil | <1 | 189–195 | 120–141 |
| Product C from soybean oil and PEG 300 | <1 | 150–170 |  |
| Cocoa butter | <1 | 190–200 | 35–40 |
| Product C from cocoa butter and PEG 300 | <1 | 155–165 |  |
| Cottonseed oil | <1 | 190–200 | 106–113 |
| Product C from cottonseed oil and PEG 300 | <1 | 160–175 |  |
| Hydrogenated palm oil | <0.5 | 225–235 | <3 |
| Product C from hydrogenated palm oil and PEG 300 | <1 | 185–200 |  |
| Hazelnut oil | <1 | 190–194 | 83–90 |
| Product C from hazelnut oil and PEG 300 | <1 | 150–165 |  |
| Chaulmoogra oil | <3 | 185–205 | 85–105 |
| Product C from chaulmoogra oil and PEG 300 | <1 | 160–180 |  |

The products of this invention have a variety of applications.

Investigations with respect to their toxicity have indicated that they are devoid of acute or chronic toxic effects. In an investigation on guinea pigs, it was found impossible to ascertain an $LD_{50}$. The animals tolerated a dose of 65 ml./kg. In contrast thereto, the fatty acid esters of polyglycol and of sorbitan (Tween 80: $LD_{50}$ in the rat being 8 to 9 ml./kg.) are not devoid of toxicity. The absordption by the oral route of products in accordance with this invention did not interfere with the normal development of several generations of mice (five generations were devoid of abnormal characteristics).

The cutaneous tolerance of the products is excellent. There is no irritation, no inhibiting action on the siliary movement, no hemolytic or lucolytic action, no anti-allergenic effect, no anaphylactic effect.

PHARMACEUTICAL AND NUTRITIONAL APPLICATIONS

A. The weak hydrophilic properties of the products in accordance with this invention provide anti-foaming properties which are of advantage in preparing anti-spume drugs for cattle.

The products may also be used in the industrial manufacture of antibiotics, yeast.

B. The products in accordance with this invention possess emulsifying power, either alone or in association with triglycerides. They favor the buccal absorption of oily pharmaceutical specialties. They provide for the rapid diffusion in the tissues of oil solute; intramuscular injections.

They allow for the rapid diffusion in vivo of fat soluble medicaments, alkaloids, hormones, salicylates, antibiotics and vaccines, essential oils, dye stuffs.

They are compatible with the principal medicaments.

The following are examples in accordance with this invention:

Example 1

The starting material is a light yellow linseed oil.

1750 grams (2 mols) of light yellow linseed oil and 300 grams of polyethylene glycol, molecular weight 300 (1 mol), are mixed in a stainless steel vessel together with 1.5 grams (0.087% based on the weight of the oil, i.e., 0.7% based on the total of the oil and the PEG 300) of caustic soda in pearls as catalyst.

When, after heating the mixture at a temperature of about 205 to 225° C. for about 2 hours, the temperature of the mixture falls to 70-90° C., there is added, under viogorous agitation, 0.09%, by weight, of the whole mass, of 95% phosphoric acid. After agitating for about 20 minutes, the mass is then filtered under nitrogen.

Advantageously the reaction vessel may be made of stainless steel to prevent formation of colored metal soaps.

The product thus obtained possesses the following characteristics:

Acid number _____ 1.6
Iodine number _____ 123
Saponification number _____ 128
Peroxide number (method of the International Union of Pure and Applied Chemistry, Division of Fatty Materials) _____ Below 10

The product is miscible with linseed oil in any proportions.

APPLICATIONS (1) *Foundry practice.*—As an additive to linseed oil in the preparation of foundry cores with a view of increasing the tensile resistance thereof, for example:

Core A composed of: Kilograms
    Core making sand (Bourron sand) _____ 5
    Linseed oil _____ 0.075
    Water _____ 0.075

Core B composed of:
    Core making sand (Bourron sand) _____ 5
    Natural lindseed oil _____ 0.0682
    The linseed oil product of the above example _____ 0.0682
    Water _____ 0.0342

After baking at 240° C. the tensile resistance expressed in kilograms per square centimeter was for each of these cores:

DURATION OF BAKING IN MINUTES

|     | Core A | Core B |
|-----|--------|--------|
| 20  | 0      | 0      |
| 29  | 6.3    | 6.7    |
| 42  | 12.6   | 17.2   |
| 60  | 15.4   | 20.6   |
| 87  | 13.6   | 21.9   |
| 125 | 11.8   | 19.5   |
| 180 | 9.5    | 16.2   |
| 260 | 8.8    | 12.9   |

The core B prepared with natural linseed oil with the addition of 10% of the linseed oil product of this example is of much higher tensile resistance than core A, which shows the importance of the present invention to this application.

(2) *Paints.*—White ground pigments prepared with a mixture of 85% natural linseed oil and 15% of the linseed oil product of this example acquire the property of being capable of dilution at the moment of manufacturing the paint with any one of the habitual solvents (linseed oil, mineral oil distillate) and likewise with 20 to 30% of their weight of water. The emulsion is readily formed, the paint obtained is matte and can be used on any surfaces whether dry or wet, by the aid of the usual appliances, brushes, rollers, guns.

(3) *Varnish.*—The linseed oil product of this example delays the oxidation of the ordinary linseed oil, which may be useful in the preparation of supple varnishes.

(4) *Glycero-phthalic paints.*—The linseed oil product of this example may be added to the solvents of glycerophthalic paints (kerosene) with a view to increasing the affinity of the paint to the surfaces to be coated.

Example 2

The starting material is peanut oil.

In accordance with the general method of preparation described in Example 1, a product was prepared from peanut oil, PEG 300 in the molar amounts of Example 1.

The product obtained had the following characteristics:

Acid number _____ 1.2
Saponification number _____ 165
Iodine number _____ 70
Hydroxyl number _____ 58

A solution of 10% thereof in peanut oil constitutes a stabilizing and water-dispersing agent for the following purposes:

(1) In the foodstuff industry, the manufacturing of biscuits, rusks, cakes, for rendering dispersible in water the fats or oils serving for enveloping flour dough and it assures moreover a better rising of the doughs and a finer dispersion of air in the pastry of a cake, bread, sponge fingers, etc.

(2) In the production of insecticide compositions to promote the dispersion of chlorinated derivatives, or of insecticides in dipping baths, and for increasing the wetting power particularly in the protection of cattle against gad-fly or bot-fly larvae.

APPLICATIONS

A. Water-dispersible derris extract:  Grams
   Chloroform extract of *Derris elliptica* _____ 8
   Acetone _____ 8
   Chloroform _____ 8
   The peanut oil product of this example _____ 8
   Emulsifying agent (dilaurate of PEG 400) ____ 8
   Water, enough to make up 1 liter.

B. Water-dispersible pyrethrum extract:
   Pyrethrum extract _____ 10
   The peanut oil product of this example _____ 48
   Emulsifying agent (as above) _____ 10
   Water, enough to make up 1 liter.

The insecticide emulsion obtained when applied to the thick tegument (skin) of cattle in the course of the treatment against gad-fly larvae wets the fur and the skin without provoking any irritation reaction, and diffuses rapidly by the intermediary of the pilo-sebaceous system in order to reach the larvae of the gad-fly which finds itself below the derm (true skin).

(3) As regards textiles, for the dispersion of the sizing in water and the breaking of the emulsion for its elimination by raising the temperature above 60° C.

(4) As regards lubrication, for the emulsifying of cutting oils in machining, which oils ar neither toxic nor irritant and hypo-allergic.

*Example 3*

In accordance with the method of preparation described in Example 1, a product was prepared from 85.3% by weight of apricot oil and 14.7% by weight of PEG 300. The catalyst was caustic soda in pearls in an amount of 0.07% by weight of the mass.

The starting material is apricot oil.

The product thus produced possesses the following characteristics:

Acid number _____ 1.4
Saponification number _____ 160–165
Iodine number _____ 75–85
Peroxide number (method of Example 1 in
   the hot) _____ Below 35
Viscosity: Engler degrees at 19° C. _____ 11.9

This product may be used:

(1) In cosmetics, as a non-ionized emulsifying agent in the production of beauty lotions, detergents or make-up removers. These preparations are stable and non-irritant.

(2) In pharmaceuticals: As an oily base or as a wetting agent in pharmaceutical preparations on oil base, in order to promote the contact of the excipient or of the vehicle with humid mucous membranes.

APPLICATIONS (1) Pharmaceutical nasal oil:  Grams
   Eucalyptol according to Pharmacopoeia _____ 5
   The apricot oil product of this example _____ 10
   Olive oil according to Pharmacopoeia _____ 85
   ――
   100

The contact of this oily preparation with the mucous membrane and the humid serosities is established perfectly owing to the hydrophilic properties of the apricot oil product of this example. The globules of oil which are thus formed do not prevent the movements of the vibratory cilia of the mucous membrane, while simple oily solutions inhibit them completely.

(2) Hydro-dispersible vitaminized oil:  Grams
   Shark-liver oil titrating 100,000 UI/grams ____ 30
   Cod-liver oil _____ 30
   The apricot oil product of this invention _____ 40
   ――
   100

This oily solution of vitamins presents the following two advantages over similar preparations: the first consists in the fact that this oil is dispersed without difficulty in potions, foods, etc., while the usual oil preparations remain fixed to the walls of the recipient; the second is concerned with the stabilization of the vitamin A by the apricot oil product of this example which is anti-oxidant.

*Example 4*

The starting material is pure olive oil.

In accordance with the method of preparation described in Example 1, a product was prepared from olive oil and PEG 300, in the molar amounts described in Example 1.

The product thus obtained has the following characteristics:

Acid number _____ 0.6
Saponification number _____ 168
Peroxide number (method of Example 1 in
   the heat) _____ Below 10 and may be used—

(1) In cosmetic as a non-ionic emulsifying agent in the preparation of nourishing beauty lotions.

(2) In pharmaceuticals as a wetting agent for pharmaceutically oily vehicles, and as a dispersing and anti-oxidizing agent in the preparation of lip-soluble vitamin solutions.

APPLICATIONS

Hydro-dispersible olive oil:  Grams
   Pure olive oil _____ 90
   The olive oil product of this example _____ 10
   ――
   100

The hydro-dispersible oil thus obtained emulsifies perfectly in cold water which makes its absorption by the patient much easier. On the other hand, the conversation of the pure olive oil is favored by the presence of the olive oil product of this example, and the latter may likewise constitute a favorable element for the solvation of a medicated body introduced into the preparation.

*Example 5*

The starting material is a hydrogenated palm oil of a melting point near 39° C.

In accordance with the method of preparation described in Example 1, a product was prepared from the hydrogenated palm oil and PEG 300, in the molar amounts set forth in Example 1.

The product obtained has the following characteristics:

Acid number _____ 0.4
Iodine number _____ 3
Saponification number _____ 195
Melting point _____ 35° and may be used—

(1) In cosmetics—since the product of this example may be considered as a non-ionic emulsifying agent, it may enter into the production of creams or lotions:

Grams
The palm oil product of this example _____ 5
Polyethylene glycol stearate 300 _____ 5
Vaseline oil according to Pharmacopoeia _____ 2
Water _____ 88
Fungicide _____ As required
Perfume _____ As required The non-ionic liquid emulsion obtained is stable in the course of time; it may be used as a nono-ionic make-up remover lotion, or serve as a base for a vegetable-oil lotion (almond, avocado).

(2) In pharmaceuticals, the palm oil product of this example may enter into the production of anhydrous or emulsified excipients, into that of suppositories, of hydro-dispersible tablets, etc.

APPLICATION

| Excipient for pomade: | Grams |
|---|---|
| The hydrogenated palm oil product of this example | 18 |
| Hydrogenated palm oil of 38°–40° C. melting point | 82 |
| | 100 |

The product obtained is homogeneous and plastic when it has been pounded conveniently. In the anhydrous state it serves as a vehicle for antibiotics which are perfectly preserved, and likewise for powders or any oily or watery solutions of medicated principle. This same hydro-dispersible excipient may absorb 10 to 30% of its weight of water, while remaining in a pasty state. It suffices to introduce the water by grinding.

This non-ionized excipient is non-irritating, it presents a great diffusion power to the skin.

APPLICATION

| Excipient for suppositories: | Grams |
|---|---|
| The hydrogenated palm oil product of this example | 50 |
| Hydrogenated palm oil of 36–38° C., in any other mass for suppositories (cocoa butter) | 50 |
| | 100 |

The mass obtained flows and is stripped from the mold perfectly in the usual conditions for production of suppositories. This mass permits to serve quickly as a vehicle of numerous hydro- or lip-soluble bodies. Antibiotics are perfectly preserved therein.

The diffusion of medicated principles is effected rapidly owing to the hydrophilic character of this mass.

(3) Paper industry: One may coat paper or cotton wool with the hydrogenated palm oil product of this example, either for the purpose of covering the paper with a hydrophilic fatty body (cellulose wool) or for covering the paper with a layer of a hydro-dispersible fatty body wherein one antiseptic (chlorinated derivative) or other is in a state of solution, more particularly soluble and stable in the fatty body.

This layer of a fatty body may be fixed to the paper either by calendering, or by atomizing and subsequent drying of an emulsion of a hydro-dispersible fatty body obtained with the aid of hydrogenated palm oil treated according to the present invention.

It will be understood that the foregoing description of the invention and the examples set forth are merely illustrative of the principles thereof. Accordingly, the appended claims are to be construed as defining the invention within the full spirit and scope thereof.

We claim:
1. The method which comprises heating 2 mols of a member of the triglyceride group consisting of vegetable oils and the hydrogenated forms thereof and 1 mol of a polyethylene glycol having a molecular weight of 200 to 800 at a temperature of 205–225° C. in the presence of a catalyst selected from the group consisting of lime and caustic soda, the amount of the catalyst being about 0.05 to 0.2 percent by weight of the triglyceride, thereby to effect esterification of the polyethylene glycol.

2. The method which comprises heating for a period of about 2 hours 2 mols of a member of the triglyceride group consisting of vegetable oils and the hydrogenated forms thereof and 1 mol of a polyethylene glycol having a molecular weight of 200 to 800 at a temperature of 205–225° C. in the presence of a catalyst selected from the group consisting of lime and caustic soda, the amount of the catalyst being about 0.05 to 0.2 percent by weight of the triglyceride, thereby to effect esterification of the polyethylene glycol.

3. A product as obtained by the method of claim 2.

4. The method which comprises heating for a period of about 2 hours 2 mols of a member of the triglyceride group consisting of vegetable oils and the hydrogenated forms thereof and 1 mol of a polyethylene glycol having a molecular weight of 200 to 800 at a temperature of 205–225° C. in the presence of caustic soda as catalyst, the amount of the catalyst being about 0.05 to 0.2 percent by weight of the triglyceride, thereby to effect esterification of the polyethylene glycol.

5. The method which comprises heating for a period of about 2 hours 2 mols of a vegetable oil and 1 mol of a polyethylene glycol having a molecular weight of 200 to 800 at a temperature of 205–225° in the presence of caustic soda catalyst, the amount of the catalyst being about 0.05 to 0.2 percent by weight of the vegetable oil thereby to effect esterification of the polyethylene glycol.

6. The process as defined in claim 2 wherein the molecular weight of the polyethylene glycol is 200.

7. The process as defined in claim 2 wherein the molecular weight of the polyethylene glycol is 300.

8. The process as defined in claim 2 wherein the molecular weight of the polyethylene glycol is 400.

9. The process as defined in claim 2 wherein the molecular weight of the polyethylene glycol is 500.

10. The process as defined in claim 2 wherein the molecular weight of the polyethylene glycol is 600.

11. The process as defined in claim 2 wherein the molecular weight of the polyethylene glycol is 800.

12. The process as defined in claim 2 wherein the triglyceride is linseed oil.

13. The process as defined in claim 2 wherein the triglyceride is apricot oil.

14. The process as defined in claim 2 wherein the triglyceride is hydrogenated palm oil.

References Cited by the Examiner
UNITED STATES PATENTS

| 2,401,966 | 6/1946 | Salathiel | 260—410.6 |
| 2,634,278 | 4/1963 | Khurt | 260—410.6 |

CHARLES B. PARKER, *Primary Examiner.*

D. D. HORWITZ, *Examiner.*

A. H. SUTTO, *Assistant Examiner.*